Sept. 22, 1970 A. M. ADELSON ET AL 3,530,310

TOUCH, ACTIVATED DC SWITCH AND PROGRAMMER ARRAY

Filed Oct. 28, 1966 3 Sheets-Sheet 1

INVENTORS
ALEXANDER MICHAEL ADELSON
JEROME SWARTZ

BY Rupert J. Brady
ATTORNEY

TOUCH, ACTIVATED DC SWITCH AND PROGRAMMER ARRAY
Filed Oct. 28, 1966 
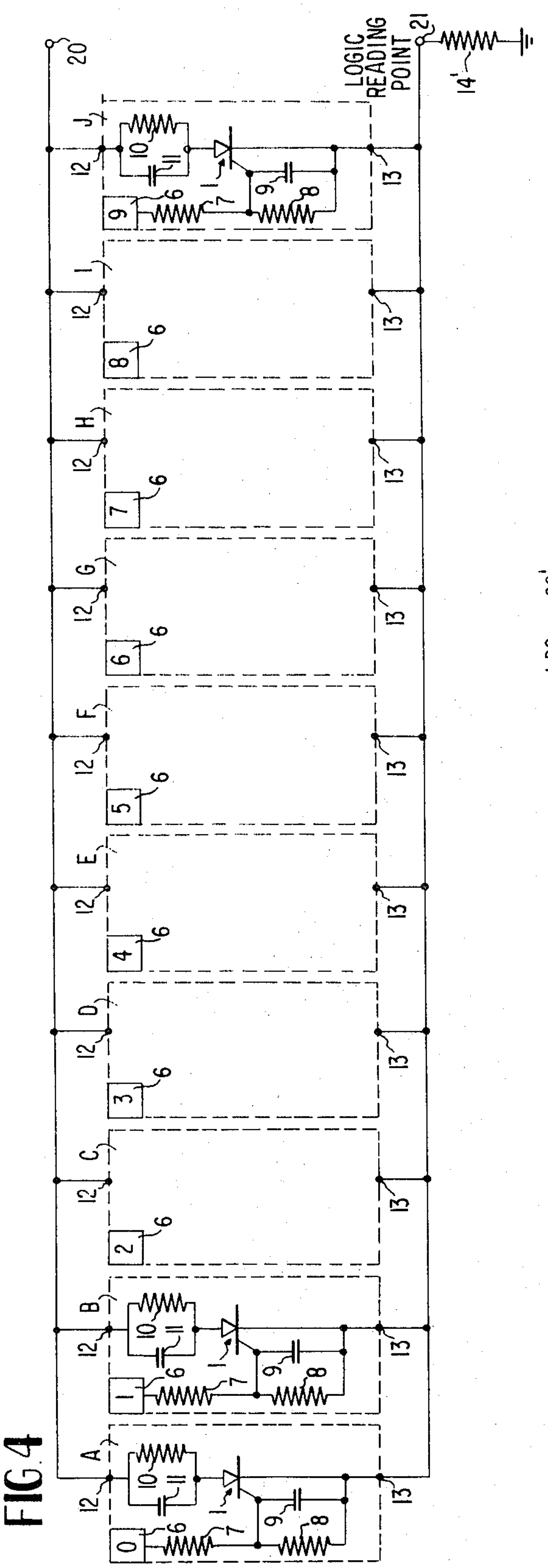
FIG 4
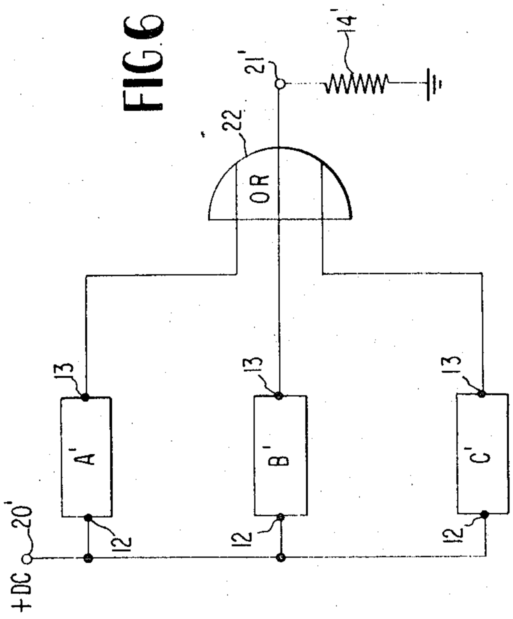
FIG 6
TOUCH ONE STATION AT A TIME ONLY
DIGIT OUTPUT
| STATION | 0 | 1 | 2 | 3 | 4 | 5 | 6 | 7 | 8 | 9 |
|---|---|---|---|---|---|---|---|---|---|---|
| A | $\Delta t_0$ | 0 | 0 | 0 | 0 | 0 | 0 | 0 | 0 | 0 |
| B | 0 | $\Delta t_1$ | 0 | 0 | 0 | 0 | 0 | 0 | 0 | 0 |
| C | 0 | 0 | $\Delta t_2$ | 0 | 0 | 0 | 0 | 0 | 0 | 0 |
| D | 0 | 0 | 0 | $\Delta t_3$ | 0 | 0 | 0 | 0 | 0 | 0 |
| E | 0 | 0 | 0 | 0 | $\Delta t_4$ | 0 | 0 | 0 | 0 | 0 |
| F | 0 | 0 | 0 | 0 | 0 | $\Delta t_5$ | 0 | 0 | 0 | 0 |
| G | 0 | 0 | 0 | 0 | 0 | 0 | $\Delta t_6$ | 0 | 0 | 0 |
| H | 0 | 0 | 0 | 0 | 0 | 0 | 0 | $\Delta t_7$ | 0 | 0 |
| I | 0 | 0 | 0 | 0 | 0 | 0 | 0 | 0 | $\Delta t_8$ | 0 |
| J | 0 | 0 | 0 | 0 | 0 | 0 | 0 | 0 | 0 | $\Delta t_9$ |
FIG 5
INVENTORS
ALEXANDER MICHAEL ADELSON
JEROME SWARTZ
BY Rupert J. Brady
ATTORNEY Sept. 22, 1970 A. M. ADELSON ET AL 3,530,310

TOUCH, ACTIVATED DC SWITCH AND PROGRAMMER ARRAY

Filed Oct. 28, 1966 3 Sheets-Sheet 3

| STATION | TOUCH A' ONLY | TOUCH B' ONLY | TOUCH C' ONLY | TOUCH A' + B' | TOUCH A' + C' | TOUCH B' + C' | TOUCH A', B', +C' |
|---|---|---|---|---|---|---|---|
| A' | $\Delta t_A$ | 0 | 0 | 0 | 0 | 0 | 0 |
| B' | 0 | $\Delta t_B$ | 0 | 0 | 0 | 0 | 0 |
| C' | 0 | 0 | $\Delta t_C$ | 0 | 0 | 0 | 0 |

INVENTORS
ALEXANDER MICHAEL ADELSON
JEROME SWARTZ

BY Rupert J. Brady
ATTORNEY

United States Patent Office 3,530,310

Patented Sept. 22, 1970

3,530,310

TOUCH ACTIVATED DC SWITCH AND PROGRAMMER ARRAY

Alexander Michael Adelson, Elmsford, and Jerome Swartz, Elmhurst, N.Y., assignors, by mesne assignments, to Hall-Barkan Instruments, Inc., Tuckahoe, N.Y., a corporation of New York Filed Oct. 28, 1966, Ser. No. 594,327

The portion of the term of the patent subsequent to Feb. 3, 1987, has been disclaimed Int. Cl. H03k *17/00*

U.S. Cl. 307—252 9 Claims

ABSTRACT OF THE DISCLOSURE

A solid state momentary switch device which responds to the touch of the human body and includes an SCR whose power terminals are connected in series with a source of electric power and an electric load. Also included in the series circuit is a time constant arrangement in the form of a current flow control means which automatically varies its impedance between a high and a low impedance state. This arrangement consists of a resistor large enough to reduce the current flow to below that required for maintaining discharge through the SCR and a capacitor which presents a low initial impedance during charging and a high impedance after it is fully charged. The gate terminal of the SCR is arranged to be contacted by the human body through an isolating impedance and a low pass filter is interposed between the control terminal and a power terminal. The touching by a human body supplies an AC signal from the body to the control terminal. The invention also comprises the use of the switch circuit in various sophisticated manners such as in parallel with different time constants and also in a controllable latched ON-OFF configuration.

This invention relates broadly to switching circuits activated by the touch of a human operator or the electrical equivalent thereof, and more particularly to a DC touch activated momentary and preset momentary switch circuit and a novel compact programmer array circuit utilizing the same.

This invention is related to our copending applications Ser. No. 572,092, filed Aug. 12, 1966, for Touch Activated Semiconductor Switch, and Ser. No. 580,056 for Touch Responsive Momentary Switch Circuit, filed Sept. 16, 1966, with respect to the basic principle of switch activation or triggering, but employs the basic triggering concept in a controlled momentary DC and preset momentary DC semiconductor controlled rectifier or SCR switch, rather than in AC four-layer semiconductor switching circuits, as disclosed in the copending applications, or DC switching circuits that require separate circuit opening means to open the circuit once the DC switch has been activated to close the circuit as disclosed in the first mentioned copending application.

In DC modes of operation, converse to AC operating modes disclosed in the mentioned copending applications, hold-on or latching action is a natural occurrence; whereas achieving turn-off or commutation is the essential problem to be solved. The standard passive network techniques of achieving momentary action in any DC circuit involve the utilization of an inductance in a ringing circuit configuration. However, within reasonable inductance size, (mechanical and electrical) and reasonable cost, inductances are found to be incapable of supplying sufficiently long time constants to shut off the SCR (silicon controlled rectifier) and are thus incompatible with the DC momentary commutation requirements. Furthermore, inductances make the switch circuit sensitive to stray pickup and transients and the circuitry in the available prior art indicates no possibility for attaining either preset momentary action and/or a wide range of output pulse widths. The simple, passive network commutation scheme of the present invention described herein, using only capacitors and resistors, is believed to be a breakthrough in SCR circuit design technology itself, independent of the means of signal generator activation (i.e. turn-on). Moreover, the "on" condition shows full pulse power switching of the power supply levels available (i.e. ideal pulse switching action). In conjunction with touch activation the basic switch circuit of the present invention takes on even more useful properties.

It is therefore an object of the present invention to provide a construction of DC switching circuit activated by the touch of the human body, or its electrical equivalent, which provides recycling momentary switching action and a wide range of selected output pulse widths.

Another object of the present invention is to provide a simple construction of SCR DC switching circuit which provides automatic switch commutation with the use of only capacitors and resistors.

Another object of the invention is to provide a construction of DC switching circuit which provides preset momentary switching action, activated by the voltage pick-up of the human body to provide such switching action as long as the human body or its electrical equivalent is in contact with the switching circuit.

A further object of the invention is to provide a simple and novel touch activated programmer array switching device utilizing a plurality of interconnected DC recurrent momentary switching circuits, and having a minimum number of output terminals.

Still a further object of the present invention is to provide a construction of a novel DC ON-OFF switch utliizing a pair of the mentioned preset momentary DC switching circuits.

Other and further objects of the invention reside in the simplicity of the basic circuit construction, the compactness of the programmer array circuit device and the ease with which it can be connected into a control circuit, and other objects are set forth more fully in the following specification, and still others will become apparent to one skilled in the art from the following specification, by reference to the accompanying drawings, in which.

FIG. 4 is an electrical schematic diagram of a programmer array circuit utilizing a plurality of the circuits of FIG. 1;

Figures 7, 8:
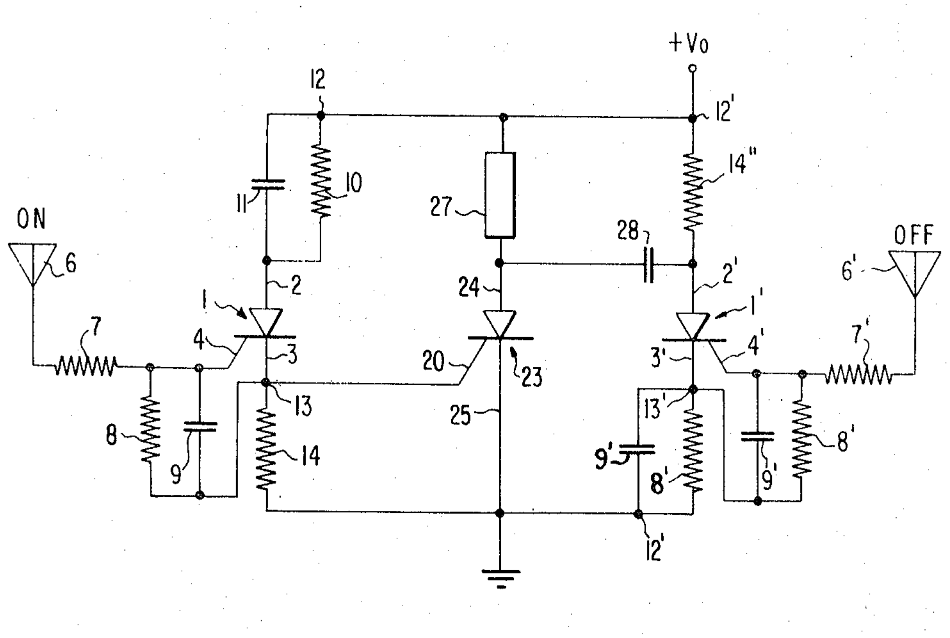

FIG. 4*a* is a fragmentary schematic diagram of a programmer array circuit illustrating a slight modification of the circuit of FIG. 4;

FIG. 5 is a logic diagram table illustrating the operation of the array of FIG. 4 when one stage of the array at a time is touch actuated;

FIG. 6 is a logic diagram of another modified form of the invention to provide ambiguity cancellation;

FIG. 7 is a logic diagram truth table for the circuit of FIG. 6; and

Figure 1:
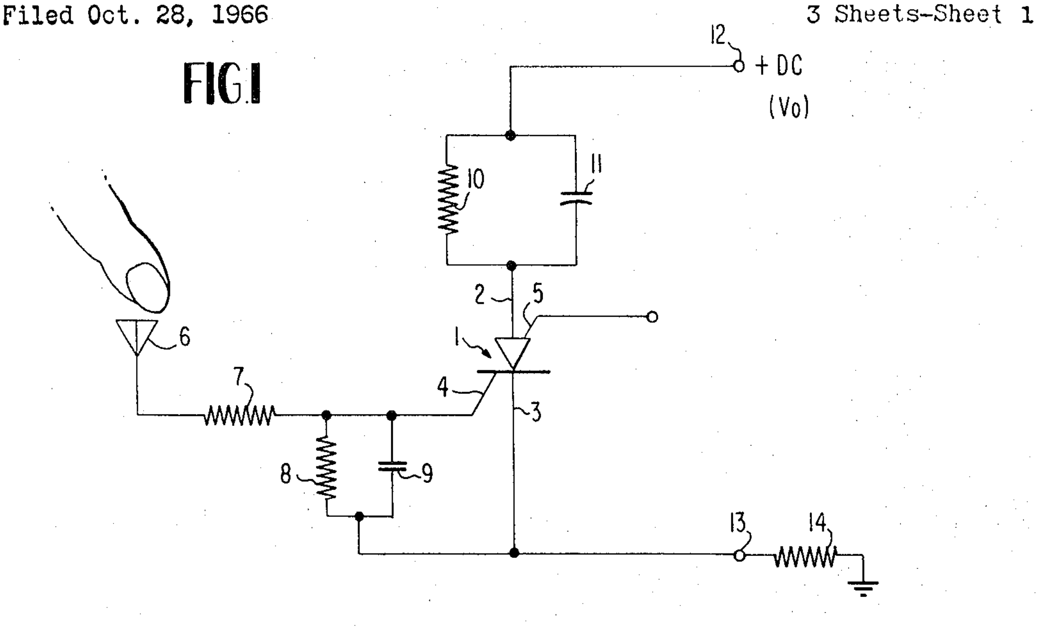
FIG. 1 is an electrical schematic diagram of the recurrent momentary DC switch of the invention.
Figure 2:
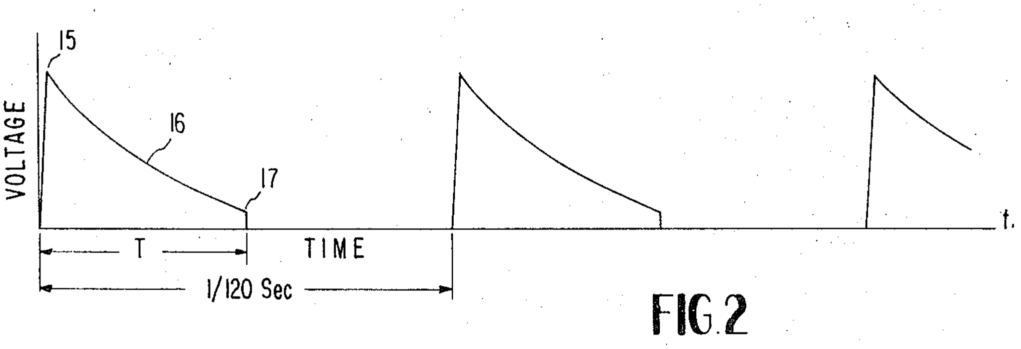
FIG. 2 is a voltage-time graph, illustrating the recurrent momentary output switching action of the circuit of FIG. 1.

FIG. 8 is another modified form of the invention showing the basic circuit of FIG. 1 used in an ON-OFF switch circuit.

Referring to the drawings in greater detail, the circuit in FIG. 1 shows a unique technique for producing commutation and resulting recurrent momentary or preset momentary switching action in a DC switching circuit at full load (pulse) power levels, without the use of inductances or any active network means, and thus embodies the basic concept of this invention. The circuit of the invention utilizes a four-layer semiconductor controlled rectifier 1, such as a silicon controlled rectifier (SCR), which has extremely sensitive cathode gate characteristics. A typical SCR which functions well in the performance of the invention is the 3N84 or a controlled rectifier, typically AA1041–HB02 as sold by Solid State Products, Inc. The gate sensitivity of these SCR's does not exceed 10 microamperes, a factor which enables the SCR's to be used in a circuit of the present invention. SCR1 includes an anode 2, cathode 3, cathode gate 4, and anode gate 5, which latter is not utilized in the present circuit.

A touch activation surface or antenna 6, which may be comprised of an electrically conductive surface, is connected through resistor 7 to cathode gate 4. Resistor 7 is in the megohm range mainly for use as a safety device to isolate the human or passive actuator and to prevent damage to SCR 1 from accidental short circuiting to a floating potential. A parallel RC "suppression" network, comprising a resistor 8 and a capacitor 9 connected in parallel, is connected between cathode gate 4 and cathode 3, to form a resistor-capacitor negative gate bias circuit and cathode gate filter. The purpose of resistor 8, and at high frequencies capacitor 9 is to provide a diversionary path for negative gate current around the cathode gate-to-cathode junction (diode). This circuit consequently reduces the forward bias on this junction (due to temperature, anode voltage, or $dv/dt$ of anode voltage effects), increasing circuit stability by effectively raising the forward breakover voltage and $dv_a/dt$ (rate effect)—withstand capability. A reduced sensitivity accrues, with respect to both signal and noise, since any antenna trigger current must also supply shunt current to this bias impedance. If the RC circuit 8, 9 was not present, spurious switching action of SCR 1 could be generated from such sources as RF radiation in the atmosphere, RF radiation from machinery in the vicinity, line noises, and various other ambient oscillations and radiation.

Experience has shown that the human body is most often modulated by 60 cycle pick-up. The main object of the present invention is to provide a solid state switch structure which operates merely upon contact with the human body independent of internal power settings and requirements. The practically omnipresent voltage pick-up by what is the essentially equilavent capacitance of the human body [i.e.—$C_b \sim 2\pi E_0$ (height) $\sim$ 100 picofarads] serving as an antenna receiver or applicator, is utilized to trigger the sufficiently current and/or voltage sensitive SCR 1. The switch is tailored to the single gate drive wave-form, that is, mainly to a 60 cycle pick-up signal applied to the SCR cathode gate 4, or anode gate 5 (which circuit is not shown but operates the same), and half-wave rectified by the cathode gate to cathode equivalent diode or anode gate to anode equivalent diode respectively.

An RC network comprising a resistor 10 (R) and capacitor 11 (C) connected in parallel is connected between anode 2 and input terminal 12, which is adapted for connection to a DC supply source, such as a 12 volt or 24 volt DC supply. Output terminal 13 is connected to cathode 3, and connects the cathode to ground through a load 14 ($r$). While the circuit of FIG. 1 shows the RC network 10, 11 connected in the anode circuit and the load 14 connected in the cathode circuit, although not shown, the circuit locations may be reversed so that the RC network is in the cathode circuit and the load 14 is in the anode circuit or both may be located in the same leg, with no perceptible change in circuit operation.

Figure 3:
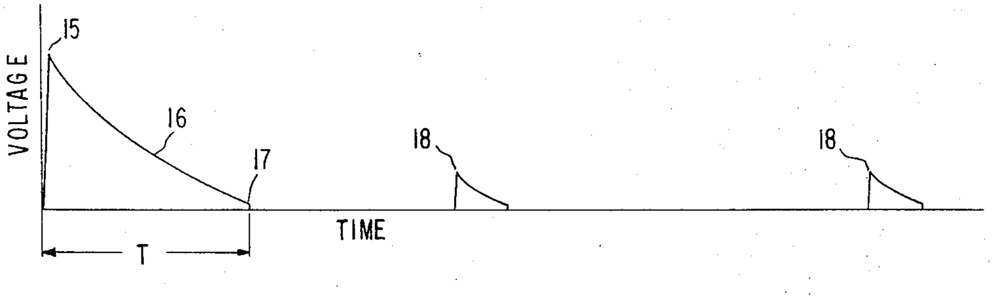
FIG. 3 is a voltage-time graph illustrating the preset momentary switching action of the circuit of FIG. 1.

The value of resistor 10 for circuits according to the invention will sufficiently reduce the load current below the holding value ($I_H$) so that SCR 1 operates momentary "on" when antenna 6 is contracted by a human finger or the like. A typical value is greater than 100K. This is with no capacitance 11 in the circuit. However, with this size of current limiting resistor 10 the load current and the voltage developed across load 14 is necessarily small. Moreover, a circuit consisting of a series capacitor (in the transient turn-on state) in series with an SCR and the load 14 operates unreliably. The solution of the present invention resides in the provision of the large resistor 10 in parallel with capacitor 11, so that the momentary "on" (commutating) capability is retained (by the large value of the resistor 10) as well as the possibility for obtaining instantaneous full voltage across, and load current through, load 14. The sequence of events or signal flow is as follows: with SCR 1 "off" (i.e. no signal on cathode gate 4) the full DC supply voltage ($V_o$) appears across the open four-layer semiconductor device 1, so that no voltage is initially across capacitor 11. On the first positive half cycle seen by cathode gate 4 and provided by the 60 cycle voltage pickup signal on the human body or its electrical equivalent, once the hand is applied to antenna 6 the SCR 1 turns "on." That is, the pn junction diode equivalent of the 4, 3 junction becomes momentarily forward biased with a correspondingly small voltage drop of about 1 volt. But the voltage on capacitor 11 cannot change instantaneously from zero during the rapid "turn on" condition, and thus, because of the presence of the capacitor in its specified location, essentially full supply voltage initially appears across the load 14 at a current level of approximately $V_o/r$ the capacitor then acting as an instantaneous short circuit across R. The rise time of this pulse is determined and limited only by stray capacitance and the inherent turn-on time of the SCR (in the microsecond range). Now, after the turn-on region 15 of the waveforms (FIG. 3) passes and assumedly before the next positive half cycle of the signal is applied to the cathode gate 4 due to the hand still being in contact with element 6, the voltage on the capacitor 11 starts to rise and said capacitor therefore impedes the DC current. The only effective path for the current is through the large resistor 10 so that the current then drops to a value principally determined by R, as indicated at 16 in FIG. 3, and assuming that $$\frac{V_o}{r+R}$$

is less than the holding current $I_H$, the SCR 1 turns "off" as indicated at 17. During the immediately succeeding negative half of the alternating current 60 cycle signal, the voltage applied to the cathode gate is negative so that the SCR remains turned off. The system is then ready for recycling on the next positive half cycle of signal applied to the cathode gate 4, with the hand still in contact with touch antenna element 6. Once SCR 1 has turned "off," capacitor 11 has fully charged to its maximum potential in the circuit (the time constant of charging being $$\frac{rR}{r+R}C$$

or about $rC$ for $R>>r$).

Detailed theoretical analysis of the circuit operation and quantitative parameter derivations have been verified by highly repeatable and reliable testing and measurements on the practical realization of this switch circuit. The voltage waveform across load 14 ($r$) as a function of time is thus (idealizing the rapid turn-on state):

$$V_r(t)=\frac{rV_o}{r+R}\left[1+\frac{R}{r}e-t/\tau\right] \quad (1)$$

where the decay time constant $$\frac{rR}{r+R}C=\frac{rR}{r+R}C\sim rC \text{ for } r\ll R$$

The pulse width determined by the current level sinking to $I_H$ is given by:

$$T=-\tau \log_e\left[\frac{r}{R}\left(\frac{I_H}{V_o/r+R}-1\right)\right] \quad (2)$$

Optimization and sensitivity analysis to determine the parameter values giving maximum pulse width variations for small changes in parameters have been performed and experimentally validated. Range of preset momentary operation is seen to easily extend over a 100:1 pulse width range (extendable to almost 1000:1 if necessary) for parameter values of resistor 10 between 1M and 10M (approximately 1.8M optimum), load 14 between .1K, and capacitor 11 between .002 $\mu$f. to .2 $\mu$f. (with about .01 $\mu$f. as optimum). Pulse width times have been observed from 5$\mu$s. to 12 ms. for single shot operation. It is clear to anyone skilled in the state of the art that electronic means exist (e.g. diode bypass) for converting all momentary switches into preset momentaries over any parameter range by supplying a second discharge path for capacitor 11. The significant point to note about Equation 2 is that $$\frac{rR}{r+R}C$$

is directly proportional to the value of capacitor 11, C (this is observed as predicted) so that for the various stages of the touch activated programmer array device, to be explained hereinafter, only various C's or values for capacitors 11 in the various circuits are required for appropriate pulse width or programming signal time control with a fixed common load 14 for the array.

The optimum value of resistor 8 is 330K and the optimum value of capacitor 9 is .01 $\mu$f. to provide greatest stability against spurious triggering effects and enhancement of proper and reliable touch activated switch operation by the human body, or its electrical equivalent.

A programmer array circuit incorporating a plurality of interconnected touch activated preset momentary variable pulse width switching circuits according to FIG. 1 is shown in FIG. 4. This programmer array device is extremely simple in construction and provides only a two wire or three wire connection to the external circuit it is to control. The touch responsive programmer array device has application in any type programmed operation where a contact closure is responsible for actively or passively feeding information to electronic logic circuitry or the electromechanical equivalent.

It has been shown that "preset momentary" action is possible with the DC momentary circuit switch of FIG. 1. The time constant ($\tau \sim rC$) and pulse width T associated with this effect is an adjustable function within certain practical limits, but essentially independent of the frequency of the operator's hand signal applied to the touch element or antenna 6. Laboratory investigation has shown that the spectrum associated with these limits is sufficient to enable application to certain time coded devices. Foremost among these is a telephone touch dialing circuit which upon further investigation reveals equal usefulness in computer control technology, calculator and other business machinery by replacement of the existing punch keyboards with a true solid state touch activated array keyboard as in FIG. 4, and similar milieus. The following description of the array of FIG. 4 deals only with the touch dialing device and touch keyboard device, per se, but extends without essential modification, except as to the number of circuits according to FIG. 1, which are utilized to the other areas. It is to be understood that any number of circuits according to FIG. 1 can be combined for a particular purpose, in the manner set forth in FIG. 4.

Based on the preceding analysis and discussion it is reiterated that various distinct and reliable pulse widths can be separately achieved from the circuit of FIG. 1. Consequently, by combining two or more such switches, each possessing a different output pulse width or T by virtue of a different anode capacitor 11, and by feeding them to a common load 14' to drive any external or "user" circuitry, in effect a logic element is provided. FIG. 4 shows ten stages A, B, C, D, E, F, G, H, I and J, of the preset momentary switch circuit of FIG. 1 with the respective terminals 12 and 13 thereof commonly connected to programmer array output terminals 20 and 21, respectively. Output terminal 20 is adapted for connection to a DC power source and output terminal 21 is connected to ground through the common load 14', and also constitutes the logic reading point for connection to the external circuitry to be controlled. Each of the programmer array stages A, B, C, D, E, F, G, H, I and J includes the circuit elements 1, 2, 3, 4, 5, 6, 7, 8, 9, 10 and 11 as described in connection with the circuit of FIG. 1, and each stage represents one of the ten decimal digits 0, 1, 2, 3, 4, 5, 6, 7, 8 and 9, respectively, as indicated in the touch surface or antenna 6 of each of the stages in FIG. 4. Since the stages are connected to a common load 14' and since each stage has a different value of capacitor 11 so that a different pulse width is obtained from each stage when actuated by the human finger or electrical equivalent touching the respective element 6, the programmer array achieves a time coded dialing or keying system whereby upon consecutive touchings of surfaces 6 of different stages a series of output pulses of different widths is obtained at terminal 21, corresponding to respective digits.

The touch activated array circuit of FIG. 4 is a two wire system when common load resistor 14' is remotely located in the external circuitry, or receiving logic, and is a three wire connection circuit when load 14' is packaged with the array circuit. The entire circuit is packaged on a hybrid printed circuit referred to as the programmer array board, to be discussed in further electromechanical detail. The tie point, both conceptually and circuitwise, is the interplay of the various and distinct pulse width (never applied at simultaneous instants in time, as indicated in the logic diagram table of FIG. 5) modulated signals through a common load resistor 14'. The use of a common logic drive load 14', which actually determines the pulse width of each of the 10 individual circuits A, B, C, D, E, F, G, H, I and J is the interaction mechanism which renders the array compact and efficient.

The practical use of time logic implies the existence of time coded receiving logic for connection to output terminal 21. Such receiving logic is, in fact, well known to those skilled in the art, and is readily available, therefore requiring little or no basic discussion.

Two ancillary ideas that make the use of this "dialing" or "keying" technique easier to apply are the use of pulse shaping circuitry, and/or ambiguity cancellation circuitry. Pulse shaping circuitry converts the innate analog output function at 21 to the easier to handle digital form of logic information. Schmitt triggers, difference amplifiers, pulse "or" gates, etc., can amply achieve the desired effect. There exists the possibility of using another SCR in tandem with the circuit of FIG. 4 to achieve squaring as part of the basic switch function or simply utilizing a Zener diode for clipping and squaring the output pulse. These squared pulses can then be directly integrated (see FIG. 4*a*) using, for example, an operational amplifier integrator, so that voltage output is directly proportional to pulse width $T_1$.

In some cases, ambiguity cancellation is necessary to eliminate the problem of touching two or more stations simultaneously and "sending" a mixed signal. (The telephone company has the same problem with their touch tone system.) Referring to FIGS. 6 and 7 the solution is the utilization of an exclusive or gate 22 between the output terminal 13 of stages A', B' and C' and logic reading terminal point 21'. Only three touch activated preset momentary switch circuit stages A', B' and C' are shown in FIG. 6 and in the logic diagram truth table of FIG. 7 which corresponds to FIG. 6, but it is to be understood that any number of stages can be utilized. With the circuit of FIG. 6 any form of ambiguous output, such as would be caused by touching the antennas 6 of two stages at a time, will result in "no output" (see FIG. 6), although a single pulse might result from the system in any case.

The programmer array circuit of FIG. 4 can be produced as a true solid state compact keyboard by making a photograph of a drawing of a keyboard layout and, using conventional techniques, reducing it to a printed circuit so that a printed circuit picture of a keyboard is provided for replacing the standard push-button array. The outlines of "keys" on the board become the antennas 6 for the array switch stages A–J. On the opposite side of the printed circuit board, using either a double-sided laminate or a separate board, there are mounted the plurality of touch activated switch circuit stages A–J. The antennae connections of these stages are directly, through some bussing technique, mounted to the opposite side of the programming array laminate. Therefore, each individual section of the keyboard array becomes an extension of the touch activated switch circuits antennae. When the operator touches any of the sections of the keyboard array, the corresponding switch stages A–J are affected into the on-state or some more sophisticated function. If the base of the laminate is made out of a translucent or transparent material, a lamp may be located behind each of the keyboard sections or stations achieving a simple and direct indicator technique. To further simplify this economical device, the bases for the lamps could be etched onto one of the underlaminates. After the boards are prepared, gold, chrome, or any appropriate conducting hard coat is applied to the front (touch surfaces) to insure maximum beauty and wear.

A low voltage DC driven touch responsive DC ON-OFF switch circuit is shown in FIG. 8, utilizing a pair of the preset momentary switch circuits of FIG. 1 in combination with an ON semiconductor four-layer controlled rectifier such as an SCR 23. The ON button is a straightforward preset momentary circuit as in FIG. 1 and similar components are represented by similar reference numerals. A load control silicon controlled rectifier 23, having an anode 24, has its cathode 25 connected to ground, and cathode gate 26 connected to output terminal 13 of the ON SCR 1, such that SCR 1 constitutes a positive signal driver for gate 26 of SCR 23. The OFF button comprises a preset momentary circuit according to FIG. 1 with the RC circuit and load in reverse position in the cathode and anode circuits respectively, as discussed in connection with FIG. 1. Anode 2′ of SCR 1′ is connected through load 14″ to terminal 12′. Cathode 3′ is connected through the parallel connection of capacitor 11′ and resistor 10′ to terminal 12′ and thence to ground. Cathode gate 4′ is connected through the same type circuitry 7′, 8′, 9′ as SCR 1 to the touch activated element or antenna 6′ which constitutes the OFF touch element. One side of the main load 27 to be controlled is connected to the DC source $V_0$ along with terminal 12. The other side of the main load is connected to anode 24 which is also connected through capacitor 28 to anode 2′ of SCR 1′. The OFF SCR 1′ effects anode turn-off of SCR 23 by dropping the anode voltage to below cut-off.

In normal circumstances SCR 23 is OFF and there is no current flow through the main load 27. When the operator touches ON antenna 6 SCR 1 conducts, sending a positive drive pulse to gate 26, causing SCR 23 to conduct or turn ON, resulting in current flow through load 27. Once SCR 23 is turned ON it stays ON until turned OFF by positive action. When the OFF circuit of SCR 1′ is inactive, its anode 2′ is at $V_0$. When the operator's hand touches OFF antenna 6′, SCR 1′ starts to conduct due to the drive pulse on gate 3′, and the voltage of anode 2′ drops. This negative going signal change at anode 2′ is transmitted by capacitor 28, which normally blocks the steady state DC, to anode 24 of SCR 23, lowering the voltage of anode 24 and diverting its current so that SCR 23 is commutated OFF to deenergize load 27 when the current drops below the anode holding current. In effect, the OFF circuit produces a pulse opposite in polarity to the current on anode 24 to turn SCR 23 OFF. SCR 23 remains OFF until the operator again touches ON antenna 6.

While the invention has been shown and described in certain preferred embodiments, it is realized that modifications can be made without departing from the spirit of the invention, and it is to be understood that no limitations upon the invention are intended other than those imposed by the scope of the appended claims.

What we claim as new and desire to secure by Letters Patent of the United States is as follows:

1. A solid state momentary switch device, responsive to the presence of an AC signal of ambient frequency in a passive foreign body of the essentially equivalent capacitance of the human body, comprising: a semiconductor means discontinuously switchable between a conductive state and a nonconductive state, said semiconductor means including two power terminals and an electric current responsive control terminal, said semiconductor means having a control terminal sensitivity not exceeding 10 microampers, said semiconductor means turning off when the current flowing therethrough drops below the value of the holding current therefor; a DC power source; an electric resistive load; a low pass filter connected at one end to said control terminal and at the other end to a power terminal, said filter being composed of a capacitor and a resistor connected in electrical parallel, the values of said capacitor and resistor being chosen to preferentially reject the AC voltage present on a foreign body, the control terminal being devoid of any other circuit means connecting it to the other power terminal; a time constant current flow control means for automatically varying the impedance thereof between a high impedance state and a low impedance state, said means consisting of a resistor and a capacitor connected in parallel with one another and jointly in series with said power terminals, said power source and said electrical load, said capacitor presenting a low initial impedance during charging and a high impedance after it is fully charged, said resistor being large enough to reduce the current flowing through the semiconductor means to below the holding current therefor in the absence of the capacitor; means for connecting said load, said DC power source, said time constant means and power terminals in series; an electrically conductive touch element disposed in spaced relation with said semiconductor means and adapted to have an AC signal potential applied thereto; and single wire circuit means including an isolating impedance solely running from said touch element to said electric current responsive control terminal so that when said touch element is coupled with said foreign body the AC signal for said body causes said semiconductor means to switch from a nonconductive state to a conductive state and to initiate operation of the time constant means for increasing the impedance thereof from a low impedance sufficient to provide effective power flow through the load to a high impedance state wherein the capacitor is charged and at which flow of current through the semiconductor means is effectively discontinued for the purpose of controlling flow of said electrical energy through said load for a predetermined period of time, said capacitor thereafter discharging through the resistor to ready the switch device for subsequent switching of the semiconductor means to a conductive state.

2. A solid state preset momentary switch device responsive to the presence of an AC signal of ambient frequency in a passive foreign body of the essentially equivalent capacitance of the human body comprising: a semiconductor means discontinuously switchable between a conductive state and a nonconductive state, said semiconductor means including two power terminals and an electric current responsive control terminal, said semiconductor means turning off when the current flowing therethrough drops below the value of the holding current therefor; a DC power supply source; an electric resistive load; a low pass filter connected at one end to said control terminal and at the other end to a power terminal, the control terminal being devoid of any other circuit means connecting it to the other power terminal; a time constant curent flow control means for automatically varying the impedance thereof between a high impedance state and a low impedance state, said means consisting of a resistor and a capacitor connected in parallel with one another and jointly in series with said power terminals, said power source and said electric load, said capacitor presenting a low initial impedance during charging and a high impedance after it is fully charged, said resistor being large enough to reduce the current flowing through the semiconductor means to below the holding current therefor in the absence of the capacitor; means for connecting said load, said DC power source, said time constant means and power terminals in series; an electrically conductive touch element disposed in spaced relation with said semiconductor means and adapted to have an AC signal potential applied thereto; and single wire circuit means including an isolating impedance solely running from said touch element to said control terminal for coupling said touch element to said electric current responsive control terminal so that when said touch element is coupled with said foreign body the AC signal for said body causes said semiconductor means to switch from a nonconductive state to a conductive state and to initiate operation of the time constant means for increasing the impedance thereof from a low impedance sufficient to provide effective power flow through the load to a high impedance state wherein the capacitor is charged and at which flow of current through the semiconductor means is effectively discontinued for the purpose of controlling flow of said electrical energy through said load for a predetermined period of time, said capacitor and resistor having values such with respect to the load that each time the foreign body is coupled to the touch element there will only be effectively a single output voltage pulse across the electric load peaking at the full voltage of the power terminal.

3. A solid state DC switch device as set forth in claim 2 in which said resistive load has a value in the range of .1k ohm to 100k ohm.

4. A device as set forth in claim 2 wherein the power terminals are an anode terminal and a cathode terminal and the control terminal is a gate; and wherein the low pass filter is a second capacitor and a second resistor connected in parallel with one another and jointly connected between the control terminal and a power terminal.

5. A DC solid state programmer array switch circuit which comprises a plurality of solid state momentary switch devices, each said device being responsive to the presence of an AC signal in a forign body and each said device comprising a semiconductor means discontinuously switchable between a conductive state and a nonconductive state, said semiconductor means including two power terminals and an electric current responsive control terminal, said semiconductor means turning off when the current flowing therethrough drops below the value of the holding current therefor; a DC power source; an electric resistive load; a low pass filter connected at one end to said control terminal and at the other end to a power terminal, the control terminal being devoid of any other circuit means connecting it to the other power terminal; a time constant current flow control means for automatically varying the impedance thereof between a high impedance state and a low impedance state, said means constituting a resistor and a capacitor connected in parallel with one another and jointly in series with said power terminals, said power source and said electric load, said capacitor presenting a low initial impedance during charging and a high impedance after it is fully charged, said resistor being large enough to reduce the current flowing through the semiconductor means to below the holding current therefor in the absence of the capacitor; means for connecting said load, said DC power source, said time constant means and power terminals in series; an electrically conductive touch element disposed in spaced relation with said semiconductor means and adapted to have an AC signal potential applied thereto; and single wire circuit means including an isolating impedance solely running from said touch element to said control terminal for coupling said touch element to said electric current responsive control terminal so that when said touch element is coupled with said foreign body the AC signal for said body causes said semiconductor means to switch from a nonconductive state to a conductive state and to initiate operation of the time constant means for increasing the impedance thereof from a low impedance sufficient to provide effective power flow through the load to a high impedance state wherein the capacitor is charged, and at which flow of current through the semiconductor means is effectively discontinued for the purpose of controlling flow of said electrical energy through said load for a predetermined period of time, said capacitor thereafter discharging through the resistor to ready the switch device for subsequent switching of the semiconductor means to a conductive state, said devices being connected in parallel; one set of like power terminals of said plurality of commonly connected devices being connected to a common said load, whereby an output pulse is provided across said load on separate touching of each said touch element of a different device by a foreign body, the time constant current flow control means of said plurality of devices being of respectively different values, whereby each device when energized provides a corresponding output pulse of different width across said load.

6. A DC solid state programmer array switch circuit as set forth in claim 5 in which ten of said series circuits, with individual touch elements, are connected in parallel, with each said series circuit corresponding to a different programming digit.

7. A solid state touch actuated DC switch circuit which comprises a first solid state momentary switch device responsive to the presence of an AC signal in a foreign body, which switch device comprises a semiconductor means discontinuously switchable between a conductive state and a nonconductive state, said semiconductor means including two power terminals and an electric current responsive control terminal, said semiconductor means turning off when the current flowing therethrough drops below the value of the holding current therefor; a DC power source; an electric resistive load; a low pass filter connected at one end to said control terminal and at the other end to a power terminal, the control terminal being devoid of any other circuit means connecting it to the other power terminal; a time constant current flow control means for automatically varying the impedance thereof between a high impedance state and a low impedance state, said means consisting of a resistor and a capacitor connected in parallel with one another, and jointly in series with said power terminals, said power source and said electric load, said capacitor presenting a low initial impedance during charging and a high impedance after it is fully charged, said resistor being large enough to reduce the current flowing through the semiconductor means to below the holding current therefor in the absence of the capacitor; means for connecting said load, said DC power source, said time constant means and power terminals in series; an electrically conductive touch element disposed in spaced relation with said semiconductor means and adapted to have an AC signal potential applied thereto; and single wire circuit means including an isolating impedance solely running from said touch element to said control terminal for coupling said touch element to said electric current responsive control terminal so that when said touch element is coupled with said foreign body, the AC signal for said body causes said semiconductor means to switch from a nonconductive state to a conductive state and to initiate operation of the time constant means for increasing the impedance thereof from a low impedance sufficient to provide effective power flow through the load to a high impedance state wherein the capacitor is charged, and at which flow of current through the semiconductor means is effectively discontinued for the purpose of controlling flow of said electrical energy through said load for a predetermined period of time, said capacitor thereafter discharging through the resistor to ready the switch device for subsequent switching of the semiconductor means to a conductive state, said circuit further including a controlled semiconductor discontinuously switchable means having power terminals and a control terminal, said controlled semiconductor means turning off when the power applied thereto drops below a threshold value, said control terminal of the controlled semiconductor means connected to receive an input signal from a power terminal of said first device; said load of said first device constituting the gate to a first power terminal impedance of said controlled semiconductor means; main load means connected in series with the power terminals of said controlled semiconductor means and said DC power source, a second device like the first device connected in parallel with said first device; and capacitance means connected between the second power terminal of said control semiconductor means and a corresponding power terminal of the semiconductor means of said second device; whereby said controlled semiconductor means is switched to the conducting and nonconducting states to respectively energize and deenergize said main load means when said touch elements of said first and second devices are respectively contacted by a foreign body having an AC signal.

8. A touch actuated DC switch circuit as set forth in claim 7 in which the first power terminal of said first device, the corresponding power terminal of the second device and said first power terminal of said controlled semiconductor means are connected to ground.

9. A circuit as set forth in claim 5, including integrator circuit means transducing the output pulse widths into voltage output levels directly proportional to said pulse widths.

References Cited

UNITED STATES PATENTS

| | | | |
|---|---|---|---|
| 3,200,306 | 8/1965 | Atkins et al. | 307—252 |
| 3,341,717 | 9/1967 | McCracken | 307—284 |
| 3,243,602 | 3/1966 | Storm | 307—252 |
| 3,246,206 | 4/1966 | Chowdhuri | 307—305 |
| 3,287,662 | 11/1966 | Walker | 307—252 |
| 3,329,838 | 7/1967 | Myers | 307—252 |
| 3,202,935 | 8/1965 | Maluda | 307—228 |

OTHER REFERENCES

W. L. Stahl, IBM Tech. Disclosure Bulletin, vol. 2, No. 1, June 1959.

DONALD D. FORRER, Primary Examiner

J. D. FREW, Assistant Examiner

U.S. Cl. X.R.

307—265, 274, 284, 305; 328—1, 5; 331—107; 340—258